United States Patent

[11] 3,595,598

| [72] | Inventor | John N. Nuzum<br>Barberton, Ohio |
|------|----------|-----------------|
| [21] | Appl. No | 849,058 |
| [22] | Filed | Aug. 11, 1969 |
| [45] | Patented | July 27, 1971 |
| [73] | Assignee | Travel-Safe Trailer Mfg. Inc.<br>Akron, Ohio |

[54] TRAILER WITH UNITARY TIEDOWN CONTROL
3 Claims, 2 Drawing Figs.

[52] U.S. Cl. .................................................. 280/179 A, 280/414
[51] Int. Cl. .................................................. B60p 7/00
[50] Field of Search .................................. 280/179, 179.1, 414, 35

[56] References Cited
UNITED STATES PATENTS
2,536,563  1/1951  Montgomery .............. 280/414 UX
2,660,443  11/1953  Miller .............. 280/179 X
2,776,761  1/1957  Lovelace .............. 280/414 X

*Primary Examiner* — Benjamin Hersh
*Assistant Examiner* — John P. Silverstring
*Attorney* — Oldham & Oldham

ABSTRACT: The trailer is adapted for vehicle transport and has a winch means on the frame for controlling windup of a control cable on the winch, an attachment means being secured to said cable, and a pair of control cables are threaded through or adjustably engaged with the attachment means. Guide means for the control cables guide opposite ends thereof to longitudinally spaced portions of the trailer to be adjacent end portions of a vehicle thereon, and engaging members are secured to each end of the control cables for engaging a vehicle and securing it to the trailer by a unitary tightening action on the control cables by takeup on the winch means.

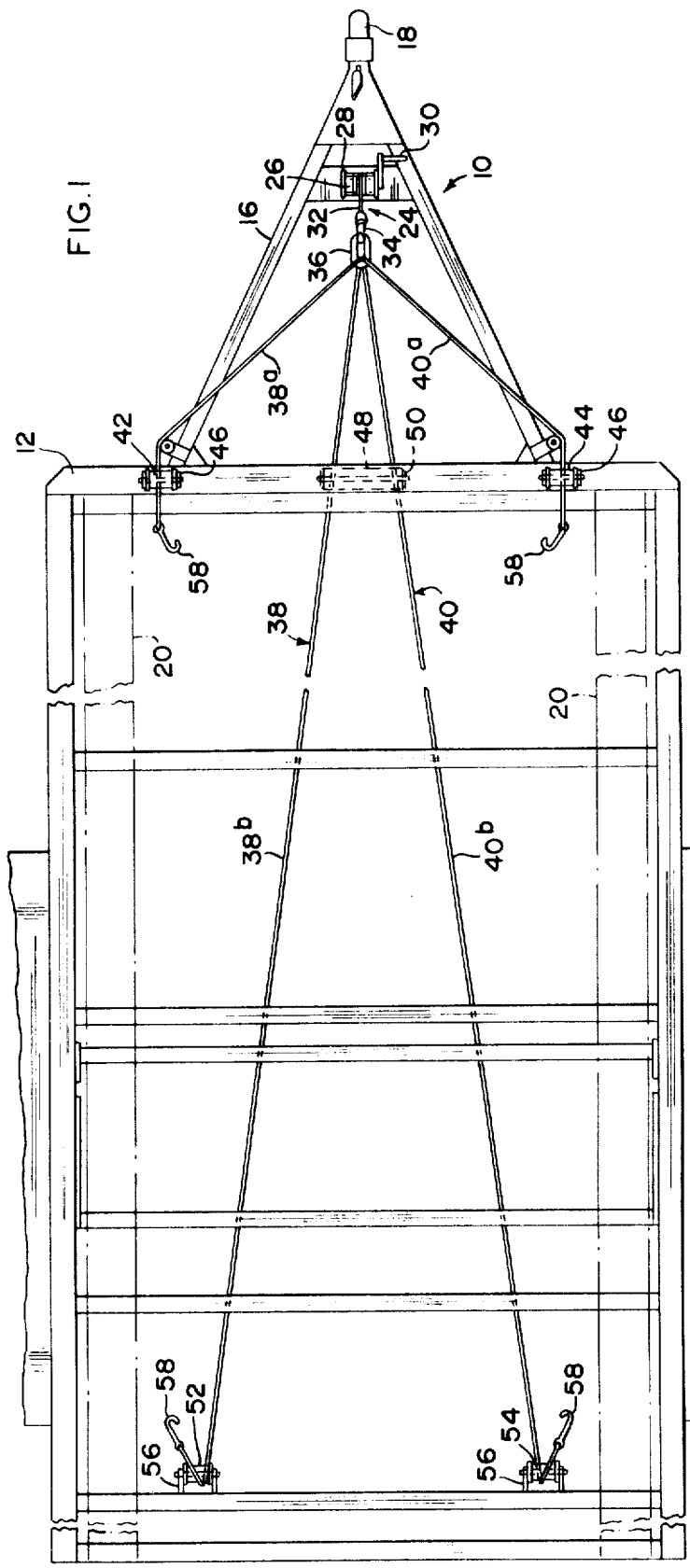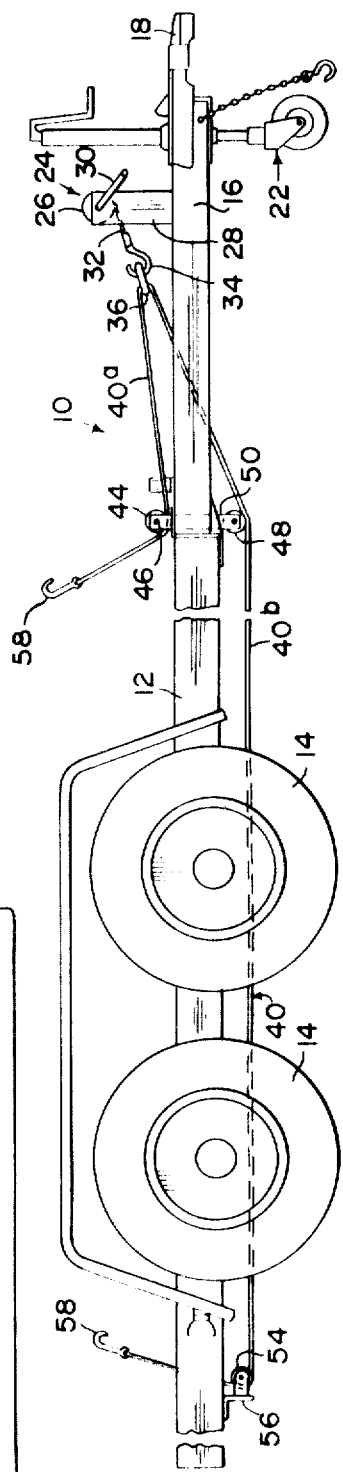
PATENTED JUL 27 1971
3,595,598
FIG.1
FIG.2
INVENTOR.
JOHN N. NUZUM
BY Oldham & Oldham
ATTORNEYS.

3,595,598

TRAILER WITH UNITARY TIEDOWN CONTROL

In general, the present invention relates to trailers for attachment to a prime mover by suitable coupler means and wherein the trailer is particularly adapted for transporting vehicles or other articles thereon. Specifically, an improved readily controlled load tiedown means is provided on the trailer by the invention.

BACKGROUND OF THE INVENTION

Heretofore there have been various types of trailers provided for transporting vehicles and other articles on the trailers which are attached to a prime mover to be pulled from one location to another. Usually some type of individual tiedown cables are provided on most of these trailers to aid in securing the load, or vehicle to the trailer for unitary movement of the vehicle and trailer.

SUBJECT MATTER OF THE INVENTION

The present invention particularly relates to a novel and improved tiedown means used on a trailer particularly adapted for transporting vehicles or other large articles thereon. The tiedown means includes a pair of control cables which adjustably engage operatively with a winch means and with the ends of the control cables being adapted to be attached, as by hook members, to the vehicle whereby the winch can tighten both control cables simultaneously and secure substantially uniform tensioning in the control cables and a uniform snubbing or tiedown action on a vehicle carried on the trailer. These control cables have suitable guides provided therefor around which the control cables are threaded or located whereby the cables are automatically self-adjusting and compensating to place equal stresses on both the front and rear of a vehicle, for example, associated with or secured to the trailer by the control cables. These control cables extend longitudinally of the frame and opposite ends of the cables are adapted to attach to opposite ends of the vehicle.

The general object of the present invention is to provide a novel and improved trailer particularly adapted for transporting vehicles thereon and wherein the vehicle is securely tied down to ride snugly and fixedly on the trailer while being transported.

Another object of the invention is to provide an improved, sturdy winch-controlled tiedown assembly for use on a trailer and wherein a plurality of control cables, normally two, are adjustably associated with the winch means to engage opposite end portions of a vehicle for tiedown action thereon.

A further object of the invention is to simplify and improve the action of fixedly securing a vehicle to a trailer to be transported thereon and whereby one unitary tightening action will achieve a simultaneous and substantially uniform tensioning or attachment of longitudinally and laterally spaced portions of a vehicle to the trailer by the novel tiedown means on the trailer of the invention.

The foregoing and other objects and advantages of the present invention will be made more apparent as the specification proceeds.

When referring to corresponding members shown in the drawings and referred to in the specification, corresponding numerals are used to facilitate comparison therebetween.

With reference to the accompanying drawings:

FIG. 1 is a plan view of a portion of the trailer of the invention having the novel tiedown means embodying the principles of the invention associated therewith; and FIG. 2 is a fragmentary broken-away side elevation of the trailer of FIG. 1.

Particular reference now is directed to the details of the structure shown in the accompanying drawings, and a trailer embodying the principles of the invention is indicated as a whole by the number 10. This trailer 10 has a substantially conventional, longitudinally extending, open-type frame 12 provided therefor and support wheels 14 are suitably operable attached to the trailer frame 12 in any conventional manner adjacent a rear portion of this frame 12. Adjacent a front portion of the frame 12, indicated at 16, usually a conventional coupling means 18 is provided for attaching the trailer 10 to a primary vehicle for pulling the trailer 10 in a conventional manner. Any desired type of longitudinally extending members, such as channels or plates 20 are operably attached to the trailer frame 12 adjacent each lateral margin thereof for receiving a vehicle (not shown) on the trailer 10 for transport action thereby. The frame 12 may have a front wheel 22 suitably operably attached thereto to aid in movement of the trailer 10 when not attached to a primary motor vehicle and to aid in load support action of an article on the trailer 10.

As one important element in the trailer 10, a conventional winch means, indicated by the numeral 24, is secured to the front portion 16 of the trailer frame. This winch means 24 includes a drum 26 suitably operably carried on a bracket 28 attached to the front portion 16 of the frame and having a control crank 30, or equivalent member, operatively secured to such drum 26 for control action on and takeup of a controlled cable 32, one end of which is operably attached to the drum 26 and with the other end of such controlled cable extending from the drum 26 in an adjustable manner for actions as to be described hereinafter in more detail. Any suitable releasable lock means is provided on the winch. The free end of the cable 32 has a suitable attachment or a adjustable connecting means operatively secured thereto. Such attachment means may comprise any conventional members and a hook 34 is shown attached to the cable 32 and which hook is in engagement with an equalizer loop ring member 36 that forms a portion of the attachment means secured to the controlled cable 32.

As a further feature of the trailer 10, usually a pair of control cables 38 and 40 are threaded through the loop member, equalizer ring or attachment ring 36 forming a portion of the operative assembly or means controlled by the winch means 24 and these cables 38 and 40 extend generally longitudinally of the trailer frame 12. In this particular instance, the cable 38 is shown as having one section 38a that extends to the front left-hand side of the trailer frame and a second section 38b that extends from the equalizer ring or means 36 to the left rear portion of the trailer frame, and likewise the control cable 40 has a section 40a that extends to the front right-hand side of the trailer frame and a section 40b that extends to the right rear portion of the trailer frame. By this particular positioning of the control cables 38 and 40, they are adapted to engage with front and rear laterally spaced portions of the vehicle positioned on the trailer frame for effective easily controlled tiedown action of the vehicle to secure it snugly to the trailer frame for safe transport thereon.

In order to guide the cables properly around the vehicle frame, preferably a pair of front guides, such as rollers 42 and 44, are attached to the frame 12 as by being secured to brackets 46 on the trailer frame and which elevate the rollers 42 and 44 slightly from the trailer frame so that the cables 38 and 40 can be threaded under such rollers for guide action therearound. The rearwardly extending portions of the control cables then normally pass from the equalizer ring or attachment unit 36 under a centrally positioned guide roller 48, which is relatively elongate, or wherein two rollers can be provided, if desired. This guide roller 48 is positioned on a bracket 50 that normally is secured to the trailer frame and extends downwardly therefrom whereby the control cables extend under such guide roller 48 and pass to the rear end of the trailer where rear guides 52 and 54 are suitably operably journaled on the frame by brackets 56 positioned on but below the frame. As the trailer frame 12 is basically of an open-type construction and only has a few crossmembers and longitudinally extending members therein, the cable end portions from the sections 38b and 40b can extend substantially vertically upwardly from the guide rollers 52 and 54 in the same manner as end portions of the front sections 38a and 40a of the control cables.

Any suitable securing means or attachment members are operatively engaged with each of the ends of the control cables 38 and 40 and thus a plurality of hooks 58 are shown individually attached to the ends of the control cables. FIGS. 1 and 2 of the drawings show the hooks and associated control cables in their normal operative positions as when attached to a vehicle or other load on the trailer. These hooks 58 then can engage with frame portions, bumpers, or any desired sections of the vehicle or load article in any conventional manner to have good engagement therewith. Naturally, when engaging the hooks 58 with the vehicle, the crank, or other lock means provided on the winch means 24 are released so that an added length of the controlled cable 32 or similar member can be pulled from the drum 26. Then the individual sections 38a and 38b, etc. of the control cables can be adjusted through the lock on the ring 36 to obtain the needed length of cable for effective attachment to the transported load or vehicle. The crank 30 will provide a unitary control for both cables and each section thereof to provide substantially uniform tiedown action on the vehicle at four spaced portions thereof. It should be noted that the guides on the rollers 42, 44, 52 and 54 are so positioned on the trailer that the cable ends will extend generally vertically upwardly when operatively positioned to engage a load on the vehicle. Thus, a novel, sturdy and easily controlled vehicle tiedown unit has been provided and the objects of the invention have been achieved.

What I claim is:

1. In a trailer for vehicle transport having a longitudinally extending open frame, vehicle load support means on an upper portion of said frame, support wheels, and a coupling means, the improvement comprising:

winch means including a rotatable drum and a controlled cable operatively secured thereto and having a free end, the winch means being positioned at the front end of the frame, an equalizer ring attached to the free end of the controlled cable;

a pair of control cables threaded through said equalizer ring;

a first pair of guide means on the frame for guiding the first ends of the control cables respectively to opposite sides of the frame adjacent the front end thereof;

a guide roller positioned below the frame for directing the second ends of the control cables below the frame and toward the rear thereof;

a second pair of guide means on the frame for guiding the ends of the control cables extending rearwardly from the guide roller respectively to opposite sides of the frame adjacent the rear end thereof; and hook members secured to each end of the control cables for engaging a vehicle.

2. The improvement according to claim 1 wherein the guide means each comprises a roller under which the respective control cable end extends and wherein the hook members are uniformly spaced laterally and longitudinally on the frame and the end portions of the control cables are adapted to extend generally vertically for vehicle engagement.

3. The improvement according to claim 1 wherein the first and second ends of one cable of the pair of control cables are directed to the same side of the frame and the ends of the other control cable are directed to the opposite side of the frame.